United States Patent [19]

Inaba et al.

[11] Patent Number: 4,626,756
[45] Date of Patent: Dec. 2, 1986

[54] NUMERICAL CONTROL SYSTEM

[75] Inventors: Hajimu Inaba, Hino; Shinsuke Sakakibara, Kunitachi, both of Japan

[73] Assignee: Fanuc Ltd, Minamitsuru, Japan

[21] Appl. No.: 755,548

[22] PCT Filed: Oct. 8, 1981

[86] PCT No.: PCT/JP81/00273
§ 371 Date: May 28, 1982
§ 102(e) Date: May 28, 1982

[87] PCT Pub. No.: WO82/01426
PCT Pub. Date: Apr. 29, 1982

Related U.S. Application Data

[63] Continuation of Ser. No. 387,849, May 28, 1982.

[30] Foreign Application Priority Data

Oct. 13, 1980 [JP] Japan .................. 55-142605

[51] Int. Cl.$^4$ ............................................. G05B 19/18
[52] U.S. Cl. ................................. 318/573; 318/568; 318/574; 364/169
[58] Field of Search ............... 318/573, 574, 568, 569, 318/568 C, 570; 364/474, 169, 167, 168, 148, 900, 191–193

[56] References Cited

U.S. PATENT DOCUMENTS

| 4,031,369 | 6/1977 | Heaman | 318/573 X |
| 4,201,937 | 5/1980 | Irie | 318/573 X |
| 4,260,940 | 4/1981 | Engelberger | 318/573 X |
| 4,385,358 | 5/1983 | Ito | 318/573 X |
| 4,420,812 | 12/1984 | Ito | 318/573 X |

FOREIGN PATENT DOCUMENTS 47-35682 11/1972 Japan .
50-26979 3/1975 Japan .

*Primary Examiner*—William M. Shoop, Jr.
*Assistant Examiner*—Patrick C. Keane
*Attorney, Agent, or Firm*—Staas & Halsey

[57] ABSTRACT

A numerical control system suited for application to a machine tool having an axis of rotation, such as a robot which employs a cylindrical coordinate system. For example, when the arm (3) of an industrial robot is rotated to transport a wrist (2), which is attached to the end of the arm (3), from a starting point ($P_1$) to an end point ($P_2$), the straight line ($L_n$) interconnecting the starting point ($P_1$) and the end point ($P_2$) is divided into a plurality of intervals $\{Q_i, Q_{(i+1)}, \ldots \}$, positional data for each axis at each of the division points is generated, and linear interpolation for each of the intervals is performed by using the positional data for each axis to move the wrist (2) approximately along the straight line.

5 Claims, 6 Drawing Figures

NUMERICAL CONTROL SYSTEM

This is a continuation of co-pending application Ser. No. 389,849 filed on May 28, 1982.

BACKGROUND OF THE INVENTION

This invention relates to a numerical control system suited for application to a cylindrical coordinate system-type robot having an axis of rotation, or to a machine tool. More particularly, the invention relates to a numerical control system in which, when transporting a movable element from a starting point to an end point while controlling the axis of rotation, a fixed point on the movable element is capable of being moved approximately along a straight line which connects the starting point and end point.

The rising cost of labor has given rise to a demand for labor-saving measures and for improvements in work procedures. Industrial robots have been put into use to meet this demand and have been very successful in doing so. Particularly outstanding results have been achieved in plants having numerous machine tools where industrial robots are used to perform such simple tasks as changing the workpieces and tools associated with each machine tool. The demand for such robots has grown yearly. FIG. 1 shows an example of an industrial robot which operates on the basis of a cylindrical coordinate system, wherein (a) is a plan view and (b) a side view. In the Figure, numeral 1 denotes a mechanical hand for gripping workpieces or the like when they are to be changed, 2 a wrist which is capable of being rotated ($\alpha$-axis) and bent up and down ($\beta$-axis), 3 an arm which can be freely extended and retracted (R-axis), 4 a shaft, 5 a casing which can be moved vertically (Z-axis) long the shaft 4 and swiveled from side to side ($\theta$-axis) on the shaft 4, 6 a frame, 7 a teaching box for teaching robot motion, 8 a control panel for operator manipulation, and 9 a control unit for storing, in succession, the instructive content based on what is taught by the teaching box 7, such as the operating position (point), the operating speed, and the various services to be performed, and for controlling the motion of the mechanical hand 1, wrist 2, arm 3 and casing 5 in accordance with the instructive content.

With playback-type industrial robots of this kind, service operations are taught in advance by the teaching box 7, and the instructive content (referred to as robot instruction data hereinafter) is stored beforehand in the memory of the control unit 9. Whenever a request for a service arrives from the machine side, a series of the robot instruction data is read out sequentially, and the robot responds by servicing the machine in repeated fashion.

The robot instruction data comprises point information regarding the point at which a service is to be performed, robot operating speed, and service codes which instruct how the robot hand is to be controlled at the point and which instruct also the exchange of signals with the machine tool side. In general, the above-mentioned teaching operation proceeds in the following order: (1) establish the memory addresses at which the robot instruction data is to be stored; (2) carry out positioning by a jog feed (manual feed); (3) set the positional information regarding to the point and set the magnitude of the speed command; and (4) set the robot service codes. A series of robot operations with respect to a machine tools is taught by repeating the steps (1) through (4).

Accordingly, as long as there are no problems with the robot control system and mechanisms, and after the positioning of the robot has been completed on the basis of the predetermined operating speed in accordance with the robot instruction data whenever there is a service request, the robot will sequentially execute, in correct fashion, such services as workpiece exchange, cleaning of machining scraps, tool exchange, manipulation of the hand, and the like.

In a robot which uses a cylindrical coordinate system, the robot is taught in such a manner that the fixed point H on the mechanical hand will move from a starting point $P_1$ to an end point $P_2$ (FIG. 2(a)). During playback, a linear interpolation is performed for each axis, with the segment from the starting point $P_1$ to the end point $P_2$ serving as a single interval. Since the robot motion between these two points includes rotational motion, however, the path followed by the fixed point H is not linear. Accordingly, in order to linearize the path followed by the fixed point H, it is conventional practice to perform sophisticated arithmetic operations which include a conversion of coordinates for each pulse distribution cycle. This has required that a computer having a considerable processing capacity be incorporated within the numerical control device (referred to as an NC hereinafter) or within a robot control device. In other words, with the conventional method an ordinary microcomputer cannot be used. This has led to an increase in the size and cost of the numerical control device or robot control device. The reason why the fixed point on a movable element such as the mechanical hand is moved in linear fashion will now be explained.

FIG. 2(b) is an illustrative view for a case where a workpiece WK is loaded onto the chuck CHK of a lathe, and is useful in describing the reason why the fixed point H on the mechanical hand 1 must be moved in linear fashion. Portions identical with those of FIG. 1 are denoted by like reference characters.

Assume that a workpiece WK is to be loaded on the chuck CHK by controlling the movement along each axis of the robot. If the fixed point H on the mechanical hand 1 is moved along the straight line SL, the workpiece WK can be mated with the chuck CHK smoothly and loaded onto the chuck without error. In a case where the fixed point H does not move along the straight line SL, however, the workpiece WK will move toward the chuck CHK from an inclined direction and therefore cannot be loaded onto the chuck in reliable fashion. Furthermore, when the workpiece is to be unloaded from the chuck it cannot be gripped with assurance, resulting in cases where the workpiece is dropped in midcourse. Thus it is far more advantageous if the fixed point on the movable element such as the mechanical hand can be moved in a linear manner. The advantages are not limited to the loading and unloading of the workpiece as described above.

SUMMARY OF THE INVENTION

Accordingly, the object of the present invention is to provide a novel numerical control system which, through a simple construction, enables a fixed point on a movable element to be moved along a straight line when the movable element, on a machine which includes an axis of rotation, is to be transported from a starting point to an end point.

The present invention relates to a numerical control system wherein, while the movable element of a machine having a plurality of operational axes inclusive of an axis of rotation, such as a machine tool or a cylindrical coordinate system-type robot having an axis of rotation, is being transported from a starting point to an end point, a predetermined point on the movable element is moved in linear fashion. In the numerical control system of the present invention, the straight line interconnecting the starting point and end point is divided into a plurality of intervals, positional data for each axis at each of the division points is generated, and linear interpolation is executed for each of the intervals by using the positional data for each axis. Furthermore, positional data for a subsequent division point $Q_{(i+1)}$ is generated while the movable element is being transported to one division point $Q_i$, a time t which satisfies the inequality $t_o < t$ is determined, where $t_o$ is the time required for generation of the positional data for the division point $Q_{(i+1)}$, and the division $Q_{(i+1)}$ is so determined as to satisfy the relation:

$$\overrightarrow{Q_i Q_{(i+1)}} = \vec{v} \cdot t$$

(where $\vec{v}$ is the linear velocity)
Thus, in accordance with the present invention, the movable element can be moved approximately along the straight line from the starting point to the end point.

DESCRIPTION OF THE PREFERRED EMBODIMENT

An embodiment of the present invention will now be described in detail in conjunction with the drawings.

Figure 1A:
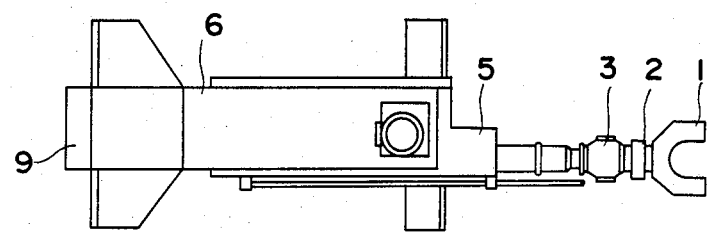
FIG. 1(a) being a plan view and FIG. 1(b) a side view of the same.
Figure 1B:
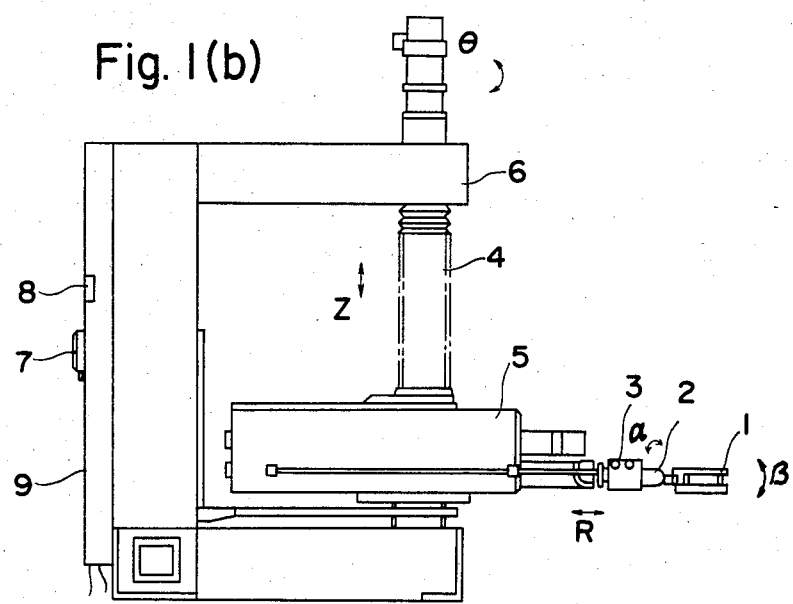
FIG. 1 is example of an industrial robot which operates on the basis of a cylindrical coordinate system.
Figure 2A:
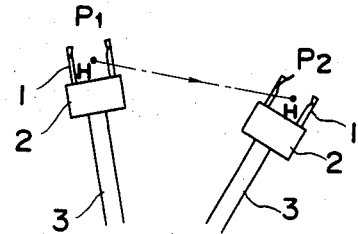
FIG. 2 is an illustrative view which is useful in describing the reason why a mechanical hand is preferably moved in linear fashion.
Figure 2B:
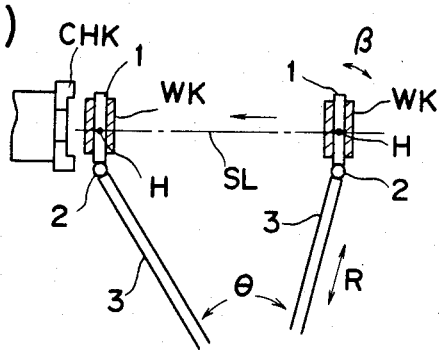
Figure 3:
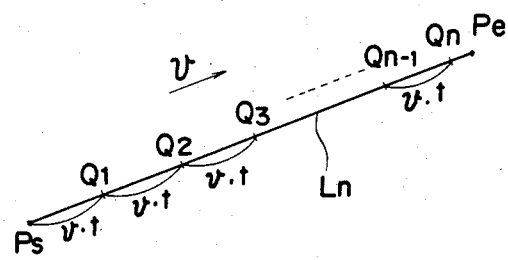
FIG. 3 is an illustrative view which is useful in describing the general features of the present invention.
Figure 4:
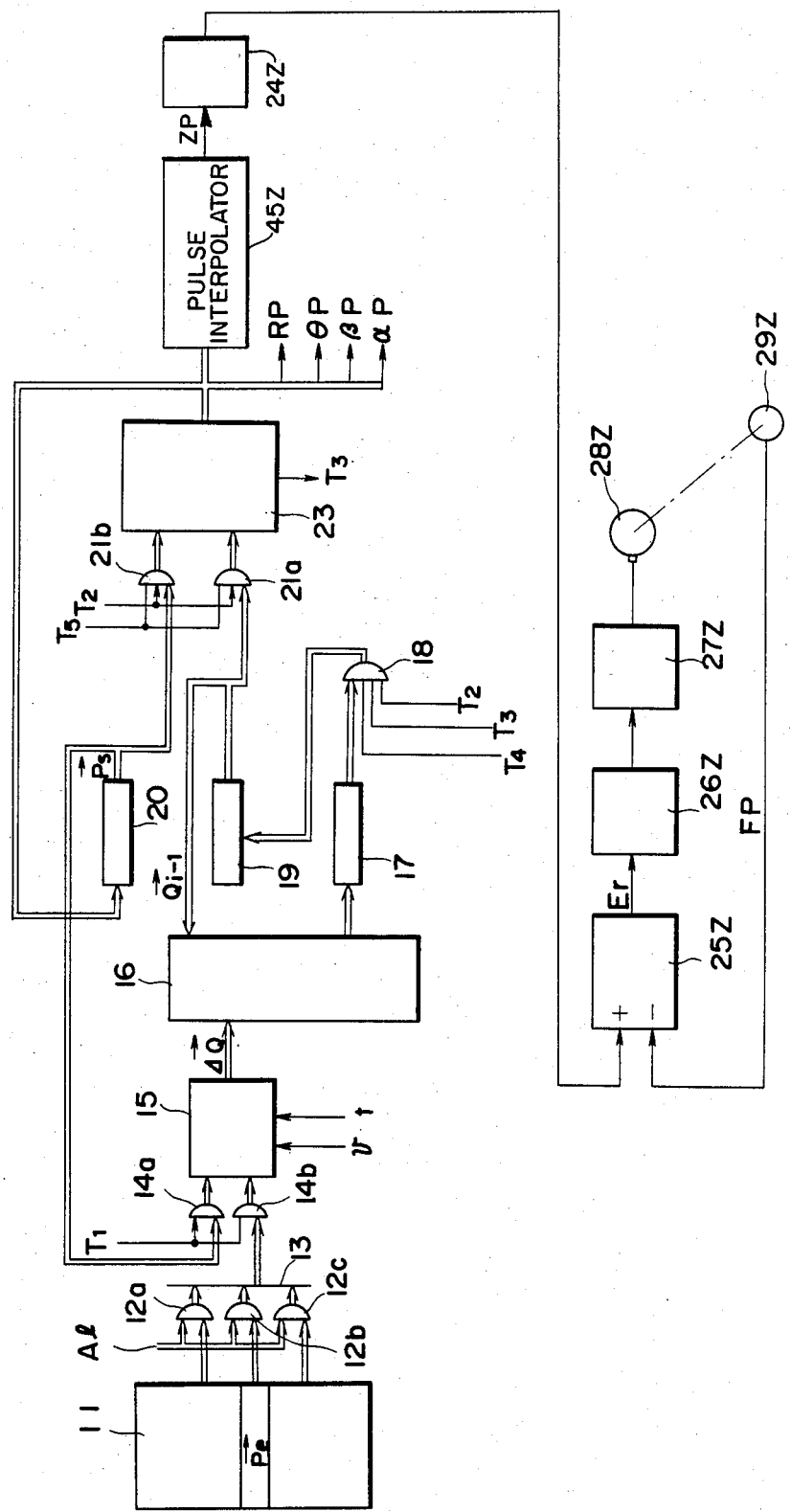
FIG. 4 is a circuit block diagram for realizing the present invention.

FIG. 3 is an illustrative view for describing the general features of the present invention, and FIG. 4 is a circuit block diagram for realizing the present invention.

In FIG. 3, Phd s denotes a starting point, $P_e$ an end point, and v the linear velocity, which is set during the teaching operation.

In the present invention, a predetermined point on a movable element, such as a mechanical hand, is to be moved linearly as the hand is being transported from the stating point $P_s$ to the end point $P_e$. To achieve this, the straight line $L_n$ interconnecting the starting point $P_s$ and the end point $P_e$ is divided into a plurality of intervals, and items of positional data for each axis at each of the division points $Q_1, Q_2, Q_3, \ldots$ are generated. Then, using this positional data for each axis, an interpolation is performed for each of the intervals to move the predetermined point approximately along the straight line $L_n$.

More specifically, as the movable element is being transported from one division point $Q_{(i-1)}$ to a division point $Q_i$ by means of a linear interpolation, the next division point $Q_{(i+1)}$ is determined so as to satisfy the relation $$\overrightarrow{Q_i Q_{(i+1)}} = \vec{v} \cdot t \quad (i = 1, 2, \ldots) \tag{1}$$

and the positional data for the division point $Q_{(i+1)}$ is generated. It should be noted that t is a fixed time interval which satisfies the inequality $t_o < t$, where $t_o$ is the time required to generate the positional data dor the division point $Q_{(i+1)}$. Thus the straight line $L_n$ is divided successively at intervals of $\vec{v} \cdot t$ beginning at the starting point $P_s$, thereby generating the division points $Q_1, Q_2, Q_3, \ldots$ with the interval $\overrightarrow{Q_i Q_{(i+1)}}$ being shifted in accordance with the linear interpolation to move the predetermined point approximately along the straight line $L_N$.

Next, a numerical control system in accordance with the present invention will be described in detail in conjunction with FIG. 4.

In the Figure, numeral 11 denotes a data memory for successively storing machining program data, such as positioning data which includes a commanded position. Numerals 12a, 12b, 12c ... denote AND gates for delivering predetermined machining program data, namely the commanded position, wherenever an address is generated on an address line A1 by address generating means, which are not shown. A commanded position is given for each axis as a distance measured from a zero point. This recommended position will be denoted by $\vec{P}_e$ hereinafter.

Numeral 13 denotes an OR gate, and numerals 14a, 14b denote AND gates which open upon the generation of a timing signal $T_1$ to provide the next stage with the commanded position vector $\vec{P}_e$ and with a starting point position vector $\vec{P}_s$, which will be described below. Numeral 15 represents an arithmetic circuit for computing an amount of travel vector $\vec{\Delta Q}$ for each interval. The amount of travel vector $\vec{\Delta Q}$ is found from the relation:

$$\vec{\Delta Q} = \frac{\vec{P}_e - \vec{P}_s}{|\vec{P}_e - \vec{P}_s|} \cdot v \cdot t \tag{2}$$

Numeral 16 designates an arithmetic circuit for computing, from the following equation, the position vector $\vec{Q}_i$ for each division point $Q_i (i = 1, 2, \ldots)$:

$$\vec{Q}_i = \vec{Q}_{(i-1)} + \vec{\Delta Q}_{i=1,2,\ldots}, \vec{Q}_0 = \vec{P}_s) \tag{3}$$

Numeral 17 denotes a buffer register which stores the position vector $\vec{Q}_i$ computed by the arithmetic circuit 16.

Numeral 18 denotes an AND gate which opens, to deliver the position vector $\vec{Q}_i$, when a buffer-full signal $T_4$, indicating that the position vector $\vec{Q}_i$ of the division point $Q_i$ has been set in the buffer register 17, a travel allowance signal $T_2$, which is generated by a control circuit that is not shown, and a distribution end signal $T_3$, which is generated by a pulse distributing circuit to be described below, together go to logical "1". Numeral 19 represents a target position register in which a target position vector (the component thereof along each axis) is set. It should be noted that the target position register 19 initially stores the starting point position vector $\vec{P}_s$, followed successively by the position vector $\vec{Q}_1$ of the first division point, the position vector $\vec{Q}_2$ of the second point, and so on. Numeral 20 denotes a current position register for storing the current position vector (the components thereof along the respective axes) of the movable element, the register initially storing the starting point position vector $\vec{P_s}$. Numerals 21a, 21b represent AND gates which open, to provide the next stage with the current position vector and with the target position vector, when the travel allowance signal $T_2$ and a target position register-full signal $T_5$ both go to logical "1", the signal $T_5$ indicating that the target position vector has been set in the target position register 19. Numeral 23 denotes a pulse distributing circuit for producing pulses ZP, RP, $\theta$P, $\alpha$P, $\beta$P distributed along the respective axes. The pulses ZP, RP, $\theta$P, $\alpha$P, $\beta$P distributed along the respective axes enter the current position register 20 which counts up or counts down, in accordance with the direction of travel, the current position components along predetermined axes each time the distributed pulses are generated. Numeral 24Z designates an acceleration/deceleration circuit for the Z-axis, which circuit is adapted to gradually increase (accelerate) the frequency of the distributed pulse train when motion starts, and to gradually decrease (decelerate) said frequency when motion is to stop. Numeral 25Z represents an error register for the Z-axis. The error register may comprise a reversible counter for storing the error $E_1$ between the number of distributed pulses $Z_p$ generated by the pulse distributing circuit 23, and a number of feedback pulses $F_p$. Numeral 26Z denotes a DA converter for generating an analog voltage which is proportional to the contents of the error register 25Z. a current amplifier, 28Z a DC motor for Z-axis drive, and 29Z a pulse coder which produces a single feed-back pulse Fp each time the DC motor 28Z rotates by a predetermined amount.

Next, the operation of FIG. 4 will be described while referring to FIG. 3.

Assume that the mechanical hand has been positioned at the point $P_s$ (starting point) in FIG. 3, and that the hand is to be transported from the starting point $P_s$ to the point $P_e$ (end point), such that the fixed point on the hand moves along the straight line $L_n$ between these two points.

At the beginning the current position register 20 and the target position register 19 store the position vector. (i.e., the components thereof along the respective axes) of the starting point $P_s$, and the arithmetic circuit 15 receives the linear velocity $\vec{v}$ and the time $\vec{t}$ as input signals.

When an address for storing the commanded position vector $\vec{P_e}$ is generated on the address line Al under these conditions, the vector $\vec{P_e}$ is applied to the AND gate 14b through the AND gate 12b and the OR gate 13. It should be noted that the AND gate 14a is receiving the current position vector $\vec{P_s}$. When the timing signal $T_1$ is generated with the vectors $\vec{P_s}$, $\vec{P_e}$ entering the respective AND gates 14a, 14b, the vectors $\vec{P_s}$, $\vec{P_e}$ are fed into the arithmetic circuit 15. When the vectors $\vec{P_e}$, $\vec{P_s}$ are received, the arithmetic circuit 15 performs the operation of Eq. (2) to find the amount of travel vector $\vec{\Delta Q}$ for each segment, and delivers the vector $\vec{\Delta Q}$ to the arithmetic circuit 16. Since the arithmetic circuit 16 is also receiving the position vector $\vec{P_s}$ ($=\vec{Q_o}$) of the starting point $P_s$ delivered by the target position register 19, it performs the operation of Eq. (3) to find the position vector $\vec{Q_1}$ of the first division point $Q_1$, and sets the vector $\vec{Q_1}$ in the buffer register 17. When the buffer-full signal $T_4$, travel allowance signal $T_2$ and distribution end signal $T_3$ together go to logical "1", the position vector $\vec{Q_1}$ is set in the target position register 19. In consequence, the target position register-full signal $T_5$ goes to logical "1", so that the position vector $Q_1$ of the target position (the first division point $Q_1$), and the current position vector $\vec{Q_s}$ enter the pulse distributing circuit 23 through the respective AND gates 21a, 21b. The pulse distributing circuit 23 computes the incremental values $\Delta Z$, $\Delta R$, $\Delta \theta$, $\Delta \beta$, $\Delta \alpha$ along the respective axes using the vectors $\vec{P_s}$ and $\vec{Q_1}$, and pulse interpolators 45z provided for corresponding ones of the axes perform linear interpolation operations on the basis of the incremental values to generate the pulses ZP, RP, $\theta$P, $\beta$P, $\alpha$P which are distributed along the respective axes. The distributed pulses ZP, RP, . . . are applied to acceleration/deceleration circuits provided for corresponding ones of the axes. It should be noted that a servo circuit, inclusive of an acceleration/deceleration circuit, is illustrated for the Z-axis only; the servo circuits for the other axes are deleted from the drawings. The frequency of the distributed pulses $Z_p$ applied to the Z-axis acceleration/deceleration circuit 24Z is increased or decreased by this circuit before being fed into the error register 25Z. The error register 25Z has its contents counted up whenever a distributed pulse $Z_p$ is generated, and counted down whenever a feedback pulse $F_p$ is generated by the pulse coder 29Z, the error register constantly delivering the deviation $E_r$ between the number of distributed pulses and the number of feedback pulses. The content $E_r$ of the error register 25Z is DA-converted by the DA converter 26Z, amplified by the amplifier 27Z and then applied to the DC motor 28Z to rotate the motor. When the DC motor 28Z rotates by a predetermined amount, the pulse coder 29A generates a single feedback pulse FP which enters the error register 25Z to count down its contents, as described above. Under steady conditions the contents of the error register 25Z will be an indication of a constant, steady deviation dependent upon the delay in the servo loop, and the operation set forth above will be repeated on the basis of this steady deviation, so that the motor 28Z, namely the robot, will be moved at the taught operating speed. After pulses corresponding to the amount of travel vector $\vec{\Delta Q}$ are eventually distributed, the pulse distributing circuit 23 issues the pulse distribution end signal $T_3$ to terminate the distribution operation. Thenceforth pulses are emitted of a number equivalent to the steady deviation stored in the error register 25Z, so that the mechanical hand may arrive at the first division point $Q_1$.

Meanwhile, as the mechanical hand is being moved toward the first division point $Q_1$, the arithmetic circuit 16 is performing the operation of Eq. (3) to obtain the position vector of the second division point $Q_2$, this position vector then being set in the buffer register 17.

When the pulse distribution up to the first division point $Q_1$ is completed and the pulse distributing circuit 23 delivers the distribution end signal $T_3$, the position vector $\vec{Q_2}$ is set in the target position register 19 and, together with the current position vector $\vec{Q_1}$, is applied to the pulse distributing circuit 23 through the respective AND gates 21a, 21b. As a result, the pulse distributing circuit 23 executes a pulse distributing operation just as described hereinabove. If the mechanical hand is thenceforth transported in similar fashion following the path $P_s \rightarrow Q_1 \rightarrow Q_2 \rightarrow \ldots Q_{n-1} \rightarrow Q_n \rightarrow P_e$, then the fixed point on the hand will move approximately along the straight line $L_n$.

Thus, in a case where the movable element of a machine having an axis of rotation is to be transported from a starting point to an end point while being accompanied by rotational motion, it is possible in accordance with the present invention to move the fixed point on the hand along a straight line so that a workpiece can be loaded and unloaded in accurate fashion.

When the system of the present invention is implemented it is not required to use a large quantity of hardware. This enables an NC which adopts the present invention to be constructed at low cost. Furthermore, because complicated computations need not be performed, a microcomputer or the like can perform the computations.

What is claimed is:

1. A numerical control system for a robot employing a cylindrical coordinate system and having a movable element and a plurality of operational axes inclusive of an axis of rotation, said movable element being rotated about said axis of rotation such that said movable element is transported from a starting point to an end point and a predetermined point on said movable element is moved in linear fashion along a straight line connecting the starting and end points, said numerical control system comprising:

dividing means for dividing the straight line which interconnects the starting point and the end point into a pluraltiy of intervals at a series of division points Qi where i=1, 2, 3 . . . ;

generating means for generating positional data for each of said operational axes at each of the division points while said movable element is moving from the current position; and executing means for executing linear interpolation for each of said intervals by using said positional data for each axis to move the predetermined point on said movable element between each of said division points such that said element moves approximately along said straight line.

2. A numerical control system according to claim 1, wherein said generating means includes means for genrating positional data for a subsequent division point $Q_{(i+1)}$ while said movable element is being transported to one said division points $Q_i$, and said system further includes determining means for determining a time t which satisfies the inequality $t_o < t$, where $t_o$ is the time required for generation of the positional data for said division point $Q_{(i+1)}$; and means for determining the subsequent division point $Q_{(i+1)}$ so as to satisfy the relation:

$$\overrightarrow{Q_i Q_{(i+1)}} = \overrightarrow{v} \cdot t$$

(where $\overrightarrow{v}$ is the linear velocity).

3. A numerical control system for a robot employing cylindrical coordinates and having a movable member and a plurality of operational axes including an axis of rotation, said numerical control system including:

current means for determining the current position of the movable member;

receiving means for receiving start point data Ps and destination point data Pe, desired velocity data v, and time constant data t for moving the movable member about the axis of rotation;

first computing means, operatively connected to receive said current position, said desired velocity data v, and said time constant data t, for computing an amount of travel ΔQ from the current position, along a straight line connecting the start point Ps and the destination point Pe and between the current position and the destination point;

second computing means, operatively connected to said first computing means, for computing division point data Qi (where i=1, 2, . . . ) between said current position on the straight line and said destination point Pe while said movable is moving from said current position;

pulse distributing means, operatively connected to receive said current position and said division point data, for calculating an incremental movement along said operational axes in accordance with said current position and said division point data; and linear interpolation means for performing linear interpolation in accordance with said incremental movement and for providing pulses for moving said movable member from the current position to said division point along the straight line.

4. A numerical control system according to claim 3, wherein said first computing means computes the amount of travel in accordance with the following:

$$\overrightarrow{\Delta Q} = \frac{\overrightarrow{P_e} - \overrightarrow{P_s}}{|\overrightarrow{P_e} - \overrightarrow{P_s}|} \cdot v \cdot t$$

5. A numerical control system according to claim 3, wherein said second computing means computes the divisional point data for each amount of travel ΔQ in accordance with the following:

$$\overrightarrow{Q_i} = \overrightarrow{Q_{(i-1)}} + \overrightarrow{\Delta Q}(1, 2, \ldots, \overrightarrow{Q_o} = \overrightarrow{P_s}).$$

* * * * *

UNITED STATES PATENT AND TRADEMARK OFFICE
CERTIFICATE OF CORRECTION

PATENT NO. : 4,626,756
DATED : December 2, 1986
INVENTOR(S) : INABA ET AL.

It is certified that error appears in the above-identified patent and that said Letters Patent is hereby corrected as shown below:

Front Page, Did not list U.S. Filing Date of 7/16/85.
Column 3, line 51, "Phd s" should be --$P_s$--.
Column 4, line 26, "Al" should be --A$\ell$--;
 line 50, "... i = 1, 2, ... ," should be --(i = 1, 2, ...,--.
Column 5, line 51, "Al" should be --A$\ell$--.
Column 7, line 28, "pluraltiy" should be --plurality--;
* line 45, after "one" insert --of--.
Column 8, line 51, "... +$\triangle$Q(1, 2" should be --... +$\triangle$Q(i = 1, 2--.

Signed and Sealed this

Fourteenth Day of April, 1987

*Attest:*

*Attesting Officer*

DONALD J. QUIGG

*Commissioner of Patents and Trademarks*